(12) United States Patent
Kuhn et al.

(10) Patent No.: US 8,292,745 B2
(45) Date of Patent: Oct. 23, 2012

(54) CONVERTIBLE RAIL FOR SELECTING PLAYER-TRACKING MODES IN AN ELECTRONIC GAME TABLE

(75) Inventors: Tyler V. Kuhn, Spokane, WA (US); Eric D. Miesch, Spokane, WA (US)

(73) Assignee: Digideal Corporation, Spokane, WA (US)

( * ) Notice: Subject to any disclaimer, the term of this patent is extended or adjusted under 35 U.S.C. 154(b) by 910 days.

(21) Appl. No.: 12/394,040

(22) Filed: Feb. 27, 2009

(65) Prior Publication Data

US 2010/0222148 A1 Sep. 2, 2010

(51) Int. Cl.
*A63F 13/08* (2006.01)

(52) U.S. Cl. ........................................................ 463/46

(58) Field of Classification Search .................... 463/46; 273/309
See application file for complete search history.

(56) References Cited

U.S. PATENT DOCUMENTS

| | | |
|---|---|---|
| 2,519,681 A | 8/1950 | Mages |
| 3,049,001 A | 8/1962 | Mackay et al. |
| 3,070,087 A | 12/1962 | Sittel |
| 3,181,351 A | 5/1965 | Stauffer |
| 3,796,433 A | 3/1974 | Fraley et al. |
| 4,072,310 A | 2/1978 | Beam |
| 4,294,451 A | 10/1981 | Wollner |
| 4,380,334 A | 4/1983 | Minkoff et al. |
| 4,531,187 A | 7/1985 | Uhland |
| 4,614,342 A | 9/1986 | Takashima |
| 4,636,951 A | 1/1987 | Harlick |
| 4,760,527 A | 7/1988 | Sidley |
| 4,813,675 A | 3/1989 | Greenwood |
| 4,926,327 A | 5/1990 | Sidley |
| 5,022,653 A | 6/1991 | Suttle et al. |
| 5,033,744 A | 7/1991 | Bridgeman et al. |
| 5,046,736 A | 9/1991 | Bridgeman et al. |
| 5,098,107 A | 3/1992 | Boylan et al. |
| 5,141,234 A | 8/1992 | Boylan et al. |
| 5,224,706 A | 7/1993 | Bridgeman et al. |
| 5,242,163 A | 9/1993 | Fulton |
| 5,255,915 A | 10/1993 | Miller |
| 5,332,219 A | 7/1994 | Marnell, II et al. |
| 5,377,973 A | 1/1995 | Jones |

(Continued)

FOREIGN PATENT DOCUMENTS

GB 2117546 A 10/1983

*Primary Examiner* — Matthew W Such
*Assistant Examiner* — Robert Carpenter
(74) *Attorney, Agent, or Firm* — Farrell Patent Law PC; Mark Farrell (57) ABSTRACT

Convertible rails for selecting player-tracking modes in an electronic game table are described. In one implementation, a rail or trim surrounds the periphery of the tabletop of an electronic game table. The rail has recessed bay openings for mounting user-interface hardware, such as for player-tracking. Player-tracking hardware may include, for example, touch-screen displays for manual input of user information, and player-identification card readers. A proprietor may install interchangeable rail section covers to expose some, all, or none of the bays. Thus, in a non-tracking mode, the bays may be covered, while in a tracking mode, some degree of player-tracking hardware mounted in the bays may be exposed to the user. In other implementations, interchangeable covers hide bays or expose hardware mounted on the tabletop itself. When the bays are covered, the cover blends in with the appearance and the surface of the tabletop, but the cover may be removed or swapped out in order to add selected hardware for the game table user.

6 Claims, 6 Drawing Sheets

U.S. PATENT DOCUMENTS

| | | | | |
|---|---|---|---|---|
| 5,377,993 | A | 1/1995 | Josephs | |
| 5,393,057 | A | 2/1995 | Marnell, II | |
| 5,407,199 | A | 4/1995 | Gumina | |
| 5,423,551 | A | 6/1995 | Stavinsky | |
| 5,496,032 | A | 3/1996 | Okada | |
| 5,511,781 | A | 4/1996 | Wood et al. | |
| 5,531,440 | A | 7/1996 | Dabrowski et al. | |
| 5,531,448 | A | 7/1996 | Moody | |
| 5,586,766 | A | 12/1996 | Forte et al. | |
| 5,586,936 | A | 12/1996 | Bennett et al. | |
| 5,613,912 | A | 3/1997 | Slater | |
| 5,630,586 | A | 5/1997 | Lowden | |
| 5,636,843 | A | 6/1997 | Roberts | |
| 5,651,548 | A | 7/1997 | French et al. | |
| 5,655,966 | A | 8/1997 | Werdin | |
| 5,669,817 | A | 9/1997 | Tarantino | |
| 5,674,128 | A | 10/1997 | Holch et al. | |
| 5,687,968 | A | 11/1997 | Tarantino | |
| 5,735,742 | A | 4/1998 | French | |
| 5,743,800 | A | 4/1998 | Huard et al. | |
| 5,766,076 | A | 6/1998 | Pease et al. | |
| 5,770,533 | A | 6/1998 | Franchi | |
| 5,779,546 | A | 7/1998 | Meissner et al. | |
| 5,788,230 | A | 8/1998 | Kuhn et al. | |
| 5,788,574 | A | 8/1998 | Ornstein et al. | |
| 5,803,808 | A | 9/1998 | Strisower | |
| 5,810,005 | A | 9/1998 | Dublin et al. | |
| 5,831,527 | A | 11/1998 | Jones, II et al. | |
| 5,839,960 | A | 11/1998 | Parra et al. | |
| 5,845,907 | A | 12/1998 | Wells | |
| 5,857,969 | A | 1/1999 | Massey et al. | |
| 5,868,392 | A | 2/1999 | Kraft | |
| 5,879,233 | A | 3/1999 | Stupero | |
| 5,879,235 | A * | 3/1999 | Kaneko et al. | 463/34 |
| 5,909,876 | A | 6/1999 | Brown | |
| 5,919,090 | A * | 7/1999 | Mothwurf | 463/25 |
| 5,924,927 | A * | 7/1999 | Matsuura et al. | 463/62 |
| 5,934,672 | A | 8/1999 | Kuhn et al. | |
| 5,934,998 | A | 8/1999 | Forte et al. | |
| 5,944,315 | A | 8/1999 | Mostashari | |
| 5,944,316 | A | 8/1999 | Hernandez | |
| 5,951,397 | A | 9/1999 | Dickinson | |
| 5,975,229 | A | 11/1999 | Dekeller | |
| 6,010,404 | A | 1/2000 | Walker et al. | |
| 6,093,101 | A | 7/2000 | Mourad | |
| 6,095,524 | A * | 8/2000 | Richter et al. | 273/269 |
| 6,099,408 | A | 8/2000 | Schneier et al. | |
| 6,110,110 | A | 8/2000 | Dublin et al. | |
| 6,158,741 | A | 12/2000 | Kuhn et al. | |
| 6,165,069 | A | 12/2000 | Kuhn et al. | |
| 6,186,895 | B1 | 2/2001 | Oliver | |
| 6,200,218 | B1 | 3/2001 | Lindsay | |
| 6,203,008 | B1 | 3/2001 | Kuhn et al. | |
| 6,203,009 | B1 | 3/2001 | Kuhn et al. | |
| 6,217,447 | B1 | 4/2001 | Lofink et al. | |
| 6,267,671 | B1 * | 7/2001 | Hogan | 463/25 |
| 6,270,404 | B2 | 8/2001 | Kuhn et al. | |
| 6,419,225 | B2 | 7/2002 | Sines et al. | |
| 6,419,226 | B2 | 7/2002 | Krise et al. | |
| 6,481,718 | B2 | 11/2002 | Koelling | |
| 6,619,659 | B2 | 9/2003 | Krise et al. | |
| 6,641,137 | B2 | 11/2003 | Sines et al. | |
| 6,651,985 | B2 | 11/2003 | Sines et al. | |
| 6,722,974 | B2 | 4/2004 | Kuhn et al. | |
| 6,776,756 | B2 | 8/2004 | Feldon et al. | |
| 6,896,259 | B2 | 5/2005 | Sines et al. | |
| RE38,982 | E | 2/2006 | Forte et al. | |
| 7,048,629 | B2 | 5/2006 | Kuhn et al. | |
| 7,201,720 | B2 | 4/2007 | Cuzzani et al. | |
| 7,255,642 | B2 | 8/2007 | Sines et al. | |
| 8,012,028 | B1 * | 9/2011 | McNamara | 463/46 |
| 2005/0215326 | A1 * | 9/2005 | Iosilevsky | 463/46 |
| 2006/0073885 | A1 * | 4/2006 | Rowe et al. | 463/26 |
| 2008/0136108 | A1 * | 6/2008 | Polay | 273/309 |

* cited by examiner

CONVERTIBLE RAIL FOR SELECTING PLAYER-TRACKING MODES IN AN ELECTRONIC GAME TABLE

BACKGROUND

Electronic game tables in casinos generally have a fixed tabletop layout to accommodate multiple players. Features for each player, such as video displays, touch-screens, game controls, and other user-interfaces are typically placed at fixed locations on the tabletop. Money exchangers and ticket printers may be mounted either on the tabletop or on one or more sides of the electronic game table. Sound speakers and a common display may also be present on the tabletop, as well as betting chip holders, chip sensors, drink holders, dealer controls, and so forth.

Once constructed, changing the locations of the hardware items mounted on an electronic game tabletop is not easy. Altering the layout by temporarily adding or removing hardware features is also not undertaken casually. Thus, it is difficult to offer ongoing flexibility to casino owners, to select and change equipment available on an electronic game table to suit current needs of the casino or the users.

Notwithstanding the difficulty, it remains advantageous to offer flexibility in the hardware accessories, options, and operational modes of an electronic game table platform to be offered for sale. There are casinos and card rooms in many different geographical locations. Each geographical location usually has its own unique laws and regulations that address gambling and betting games. Sometimes the hardware configuration of the game tabletop should reflect these differences. An electronic game table that has relatively fixed hardware features on its tabletop and sides makes it difficult to accommodate the needs of different legal jurisdictions, and also the local preferences of individual casino owners. It is relatively easy to adjust game software to fit different preferences and legal jurisdictions, but it is much more cumbersome to alter the mounted hardware configuration expressed on the tabletop to fit the various jurisdictional needs and casino preferences.

SUMMARY

Convertible rails for selecting player-tracking modes in an electronic game table are described. In one implementation, a rail or trim surrounds the periphery of the tabletop of an electronic game table. The rail has recessed bay openings for mounting user-interface hardware, such as for player-tracking. Player-tracking hardware may include, for example, touch-screen displays for manual input of user information, and player-identification card readers. A proprietor may install interchangeable rail section covers to expose some, all, or none of the bays. Thus, in a non-tracking mode, the bays may be covered, while in a tracking mode, some degree of player-tracking hardware mounted in the bays may be exposed to the user. In other implementations, interchangeable covers hide bays or expose hardware mounted on the tabletop itself. When the hardware is covered, the cover blends in with the appearance and the surface of the tabletop, but the cover may be removed or swapped out to add selected hardware for the game table user.

This summary section is not intended to give a full description of convertible rails for selecting player-tracking modes in an electronic game table, or to provide a list of features and elements. A detailed description of example embodiments of such an electronic gaming system follows.

DETAILED DESCRIPTION

Overview

This disclosure describes convertible rails for selecting player-tracking modes in an electronic game table. In one implementation, a rail or trim surrounds the periphery of the tabletop of an electronic game table. The rail has recessed bay openings for mounting user-interface hardware, such as hardware for player-tracking. The player-tracking hardware may include, for example, touch-screen displays for manual input of user information, and player-identification card readers. A proprietor may install interchangeable rail section covers to expose some, all, or none of the bays or the player-tracking hardware. Thus, in a non-tracking mode, the bays may be covered, while in a tracking mode, some degree of player-tracking hardware may be exposed to the user. In other implementations, interchangeable covers hide or expose bays or hardware mounted on the tabletop itself. When the hardware is covered, the cover blends in with the appearance and the surface of the tabletop, but the cover may be removed or swapped out to add selected hardware for the game table user.

Example System

Figure 1:
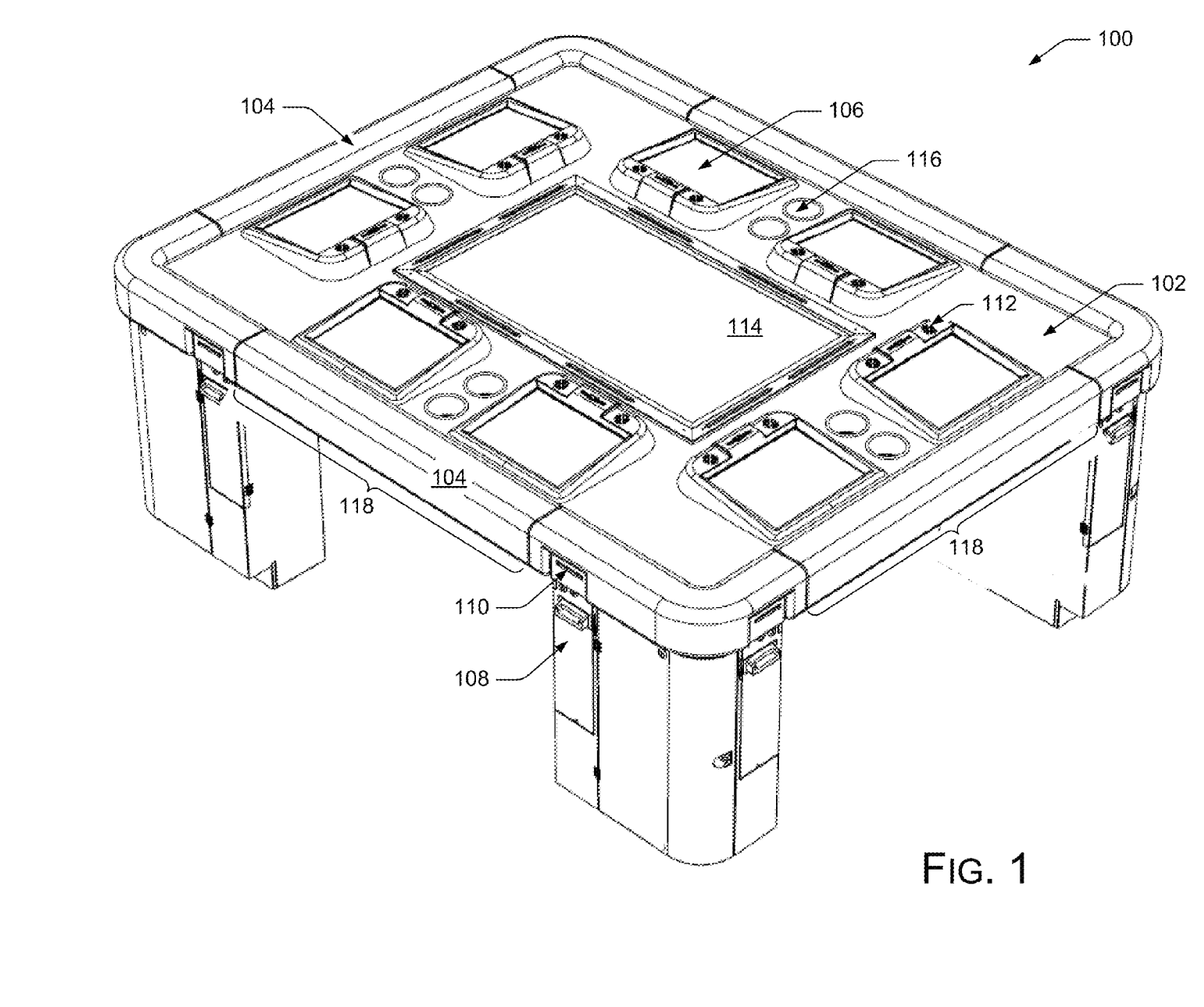
FIG. 1 is a diagram of an example electronic game table including convertible rails.

FIG. 1 shows an example electronic game table 100. Such a game table 100 is typically used for gambling, games of chance, card play, craps, roulette, etc., in a casino or card room. The game table 100 has a tabletop 102, which may include or be attached to a border or trim, referred to herein as a rail 104. The tabletop 102 provides a mount for video displays 106 for multiple players (or "users"). These may be touch-screen displays. The tabletop 102 may also support game controls and other user-interfaces placed at fixed locations. Money exchangers 108 and ticket printers 110 may be mounted either on the tabletop 102 or on one or more sides of the electronic game table 100. Sound speakers 112 and a common display 114 may also be present on the tabletop 102, as well as betting chip holders, chip sensors, drink holders 116, dealer controls, and so forth.

Rail sections 118 may have removable covers to reveal bays for mounting hardware, such as additional user-interface hardware. A set of covers for a given rail section 118 may each have a different configuration of openings, to expose selected bays for mounting hardware. Exposed bays can host mounted user-interface hardware, or else a cover that hides empty bays is used. In the example shown in FIG. 1, removable covers for the rail sections 118 hide all of the underlying bays, so that none of the bays are exposed to a player's view. Without knowledge of underlying bays, and with no seams in the rail section to give away the locations of the bays, a user playing the game is not distracted or made curious to discover what is underneath the rail 104.

Figure 2:
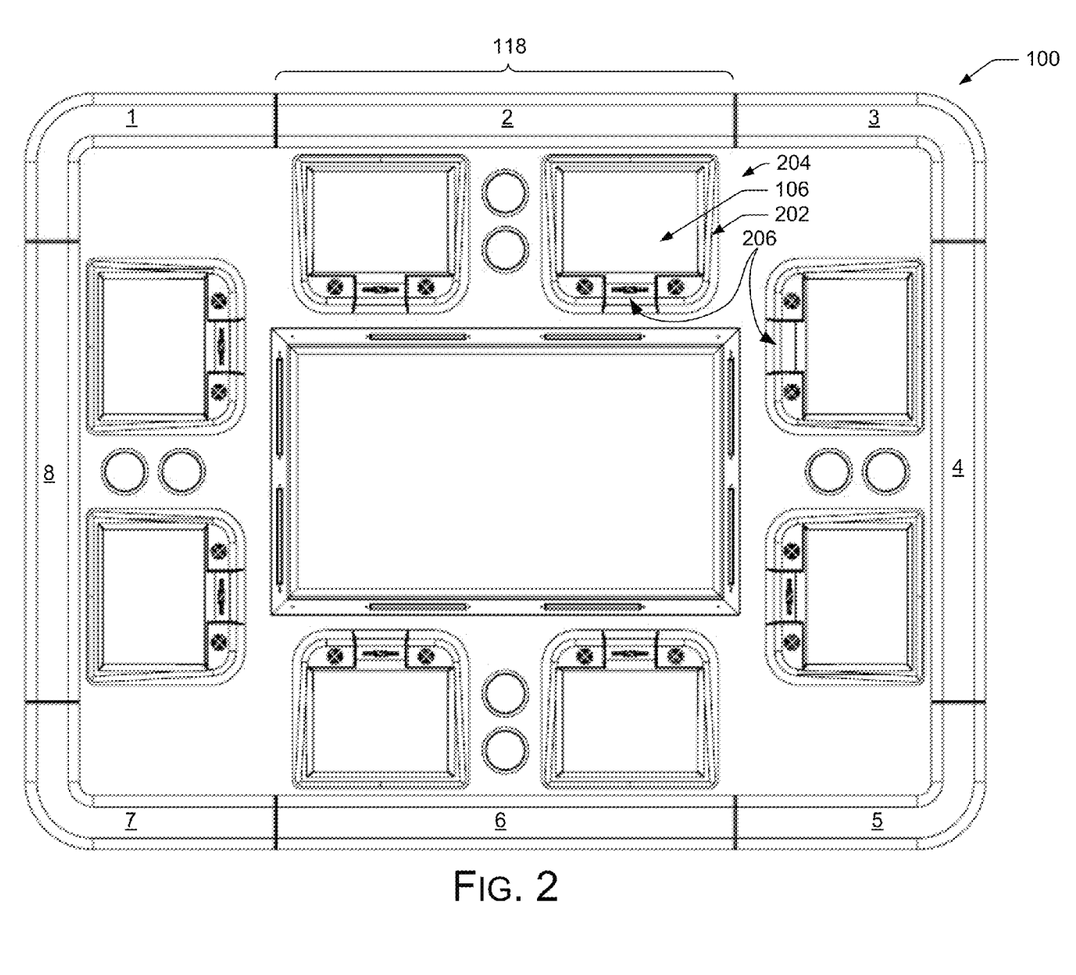
FIG. 2 is a diagram of the electronic game table of FIG. 1, showing rail sections.

FIG. 2 shows another view of the example electronic game table 100 of FIG. 1. FIG. 2 shows eight rail sections 118, numbered 1-8, that may possess bays for mounting user-interface hardware. In FIG. 2, a cover for each rail section 118 hides the underlying bays from players' view.

Likewise, the trim or bezel 202 around each video display 106 may be swapped with interchangeable bezels 202 that can either hide or expose user-interface hardware located in the respective player station 204. For example, by swapping bezels 202, a table owner can hide or reveal card-reading hardware 206.

Figure 3:
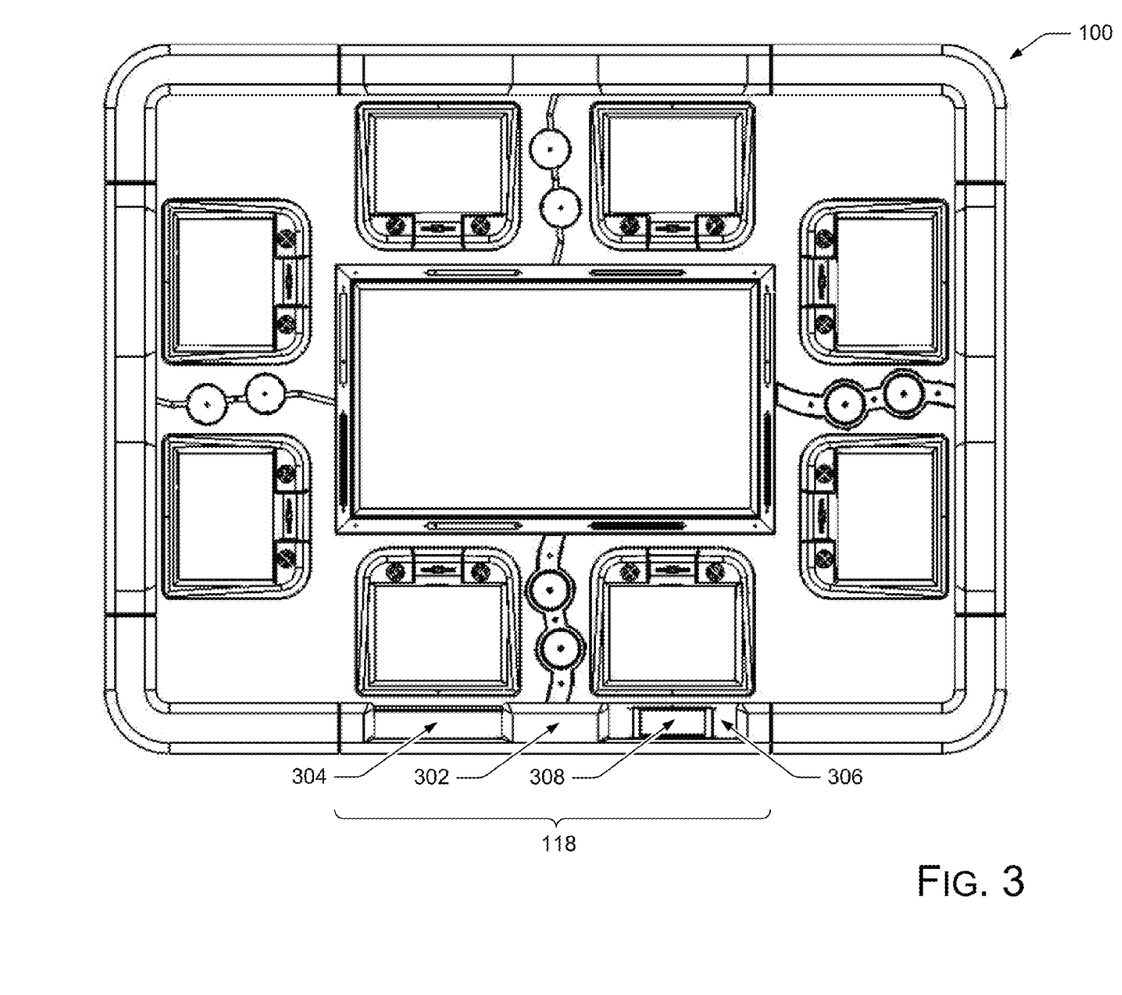
FIG. 3 is a diagram of the electronic game table with exposed bays in the rail.

FIG. 3 shows a view of the electronic game table 100 in which a cover 302 for a rail section 118 has openings to expose two bays, bay 304 and bay 306. Bay 306 has mounted within a player-tracking touch-screen display 308 for player viewing and use. Such a player-tracking user-interface (308) can be used to gather a player's nickname and other information to make a multi-player game more interesting and easier to follow. Bay 304 is depicted as an empty bay, ready to accept user-interface hardware.

Figure 4:
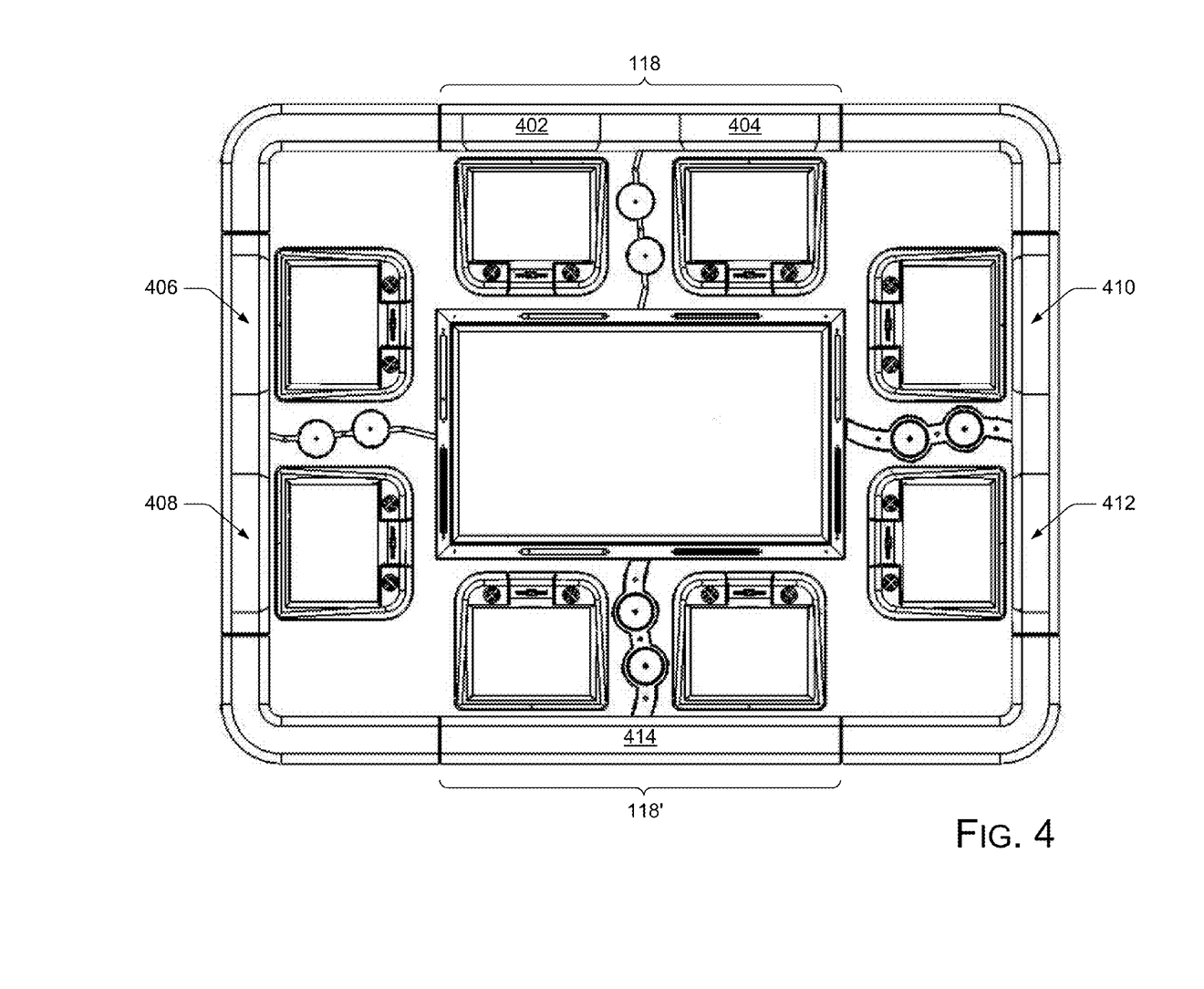
FIG. 4 is a diagram of the electronic game table with individual bay covers, and a rail section cover.

FIG. 4 shows another implementation of covers for bays located in rail sections, such as rail section 118. In this implementation, individual bays have their own respective bay covers, such as bay covers 402 and 404, and bay covers 406 and 408; 410 and 412. Each bay cover blends in with the rail 104, so that when a bay is covered, the appearance of the rail section 118 that has bay covers installed is very similar to a rail section 118' that has a single end-to-end rail section cover 414.

Figure 5:
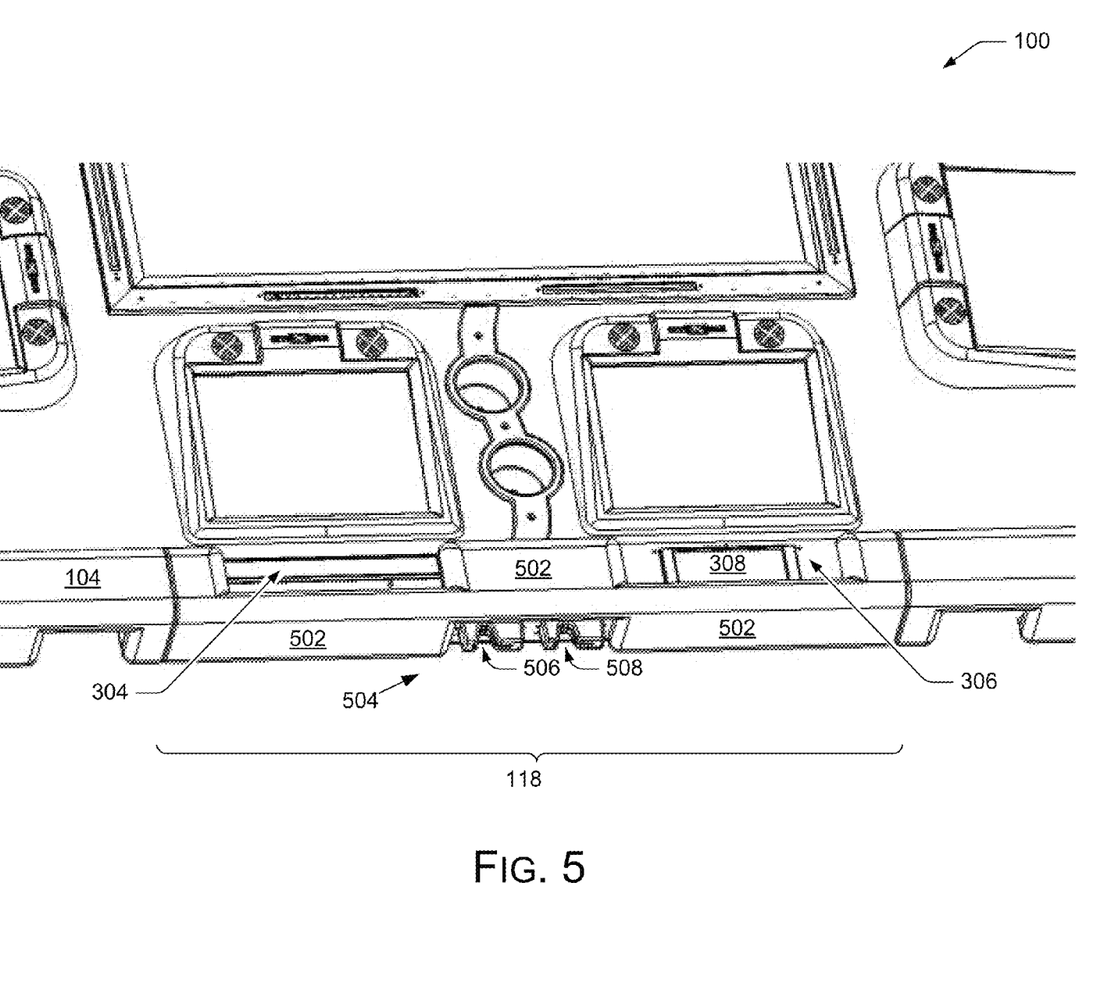
FIG. 5 is a diagram of part of the electronic game table with player-tracking hardware exposed by a selected rail-section cover.

FIG. 5 shows part of an electronic game table 100 and a rail section 118. In this implementation, a rail section cover 502 has two top openings to expose two bays. One of the two top openings exposes bay 304, which is empty and awaiting installation of player-tracking hardware, and the other top opening exposes bay 306. Bay 306 has a player-tracking touch-screen display 308 mounted within. Rail section cover 502 also has a side opening for bay 504, in which two player-ID card readers 506 and 508 are mounted, for players on either side of the bay 504.

A set of the rail section covers 502 may provide various configurations of the openings to expose or hide different combinations of the bays underlying a rail 104. When the installed hardware mounted in the bays that are adjacent to and associated with a player contain player-tracking hardware (e.g., bays 306 and 504), then the selection of a particular rail section cover 502 allows a game table proprietor to select hardware appropriate for a given player-tracking mode. In a simplest form, a given electronic game table 100 may have two player-tracking modes "on" and "off." For the "on" mode, the rail section cover 502 exposes either one or both of the player-tracking touch-screen display 308 and the player-ID card reader 508.

Figure 6:
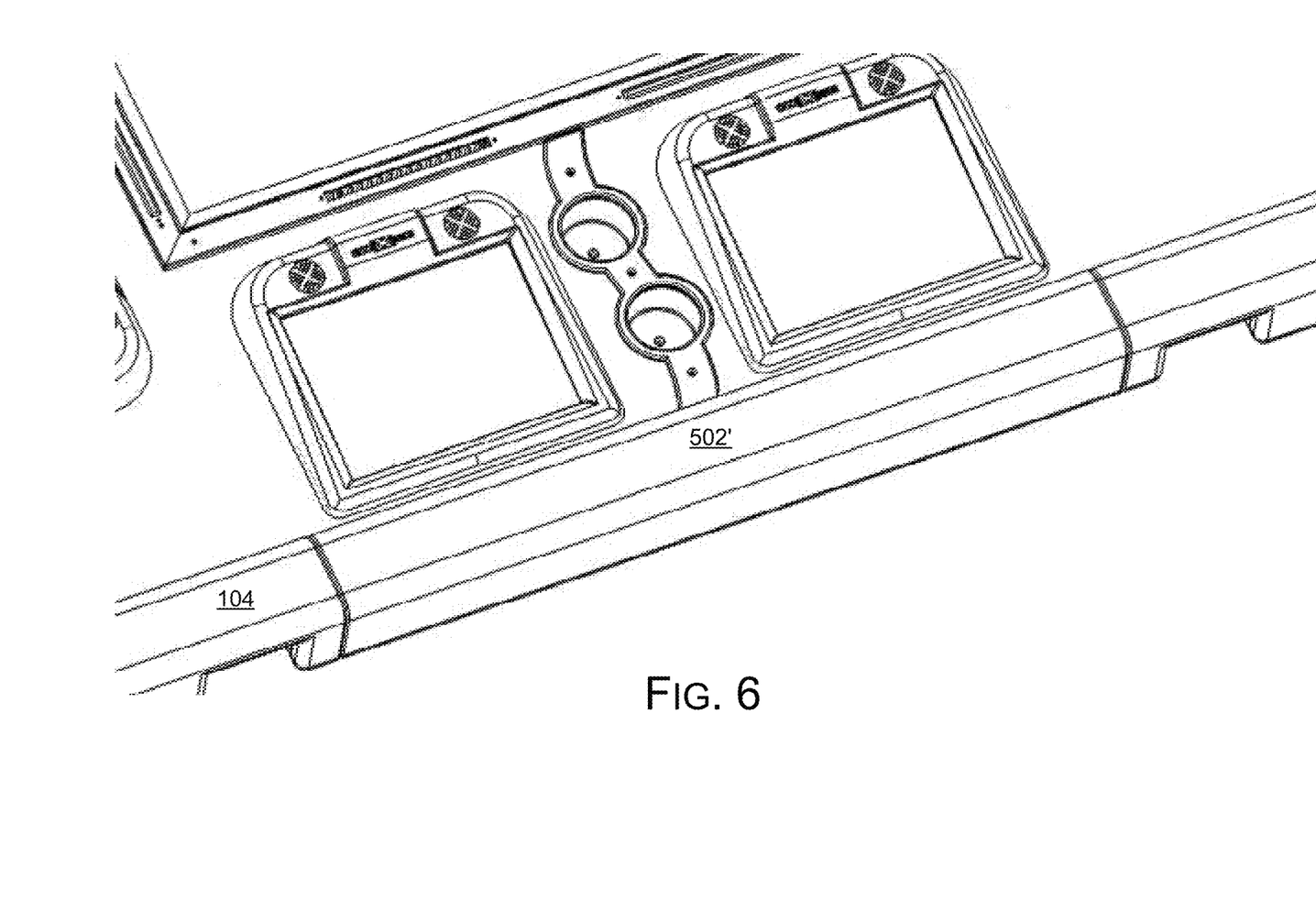
FIG. 6 is a diagram of the part of the electronic game table shown in FIG. 5, with the bays hidden by a selected rail section cover.

As shown in FIG. 6, for the player-tracking "off" mode, the associated rail section cover 502' hides bays 304, 306, and 504 (FIG. 5). In an alternative implementation, the proprietor uses the associated rail section cover 502' to temporarily cover not just the bays, but also the hardware mounted in the bays.

In one implementation, the rail 104 is constructed so that a rail section cover 502' can slide onto or into an adjacent rail cover. In this scenario, the rail section cover 502' exposes bays of mounted hardware by sliding instead of being removed and swapped with another rail section cover 502 that has openings. Other ways of moving a rail section cover 502' can also be used, such as hinged movement, rolling the rail section cover 502' into a slot, expanding a telescoping rail section cover 502', and so forth.

Alternative Implementation

In an alternative implementation of an electronic game table, the layout of user-interface hardware on the tabletop 102—displays, touch-screens, common displays, sound speakers, game controls, drink holders, and so forth—is selectable by installing one or more covers that hide hardware components not used in that configuration of the tabletop 102, while exposing other hardware components relevant to the current tabletop configuration. Such a method of selecting a user-interface layout for multiple players can be used to allow the same game table platform to host different types of games, to select the degree of player-tracking user-interfaces exposed, to limit the table to a certain number of players, etc.

Conclusion

Although exemplary systems have been described in language specific to structural features and/or methodological acts, it is to be understood that the subject matter defined in the appended claims is not necessarily limited to the specific features or acts described. Rather, the specific features and acts are disclosed as exemplary forms of implementing the claimed systems, methods, and structures.

The invention claimed is:

1. An electronic game table, comprising:
    a tabletop;
    a rail for connecting to the tabletop, the rail having sections;
    bay openings in at least one of the sections, each bay opening for exposing user-interface hardware to a user of the game table, at least one of the bay openings hosting a mounted touch-screen display for tracking an associated user of the game table and at least one of the bay openings hosting a player-ID card reader for tracking the associated user of the game table;
    a set of interchangeable section covers, connectable to the rail;
    a first section cover of the set to hide all of the bay openings;
    a second section cover of the set to expose all of the bay openings;
    at least one section cover of the set to hide the mounted touch-screen display and the player-ID card reader; and
    at least one section cover of the set to expose the mounted touch-screen display and the player-ID card reader.

2. The electronic game table as recited in claim 1, wherein a section cover hides a selected first number of the bay openings from a view of an electronic game table user; and
    wherein the section cover exposes a selected second number of the bay openings to the view of the electronic game table user.

3. The electronic game table as recited in claim 1, wherein each section cover slidably connects to the tabletop.

4. The electronic game table as recited in claim 1, wherein each section cover removably connects to the tabletop.

5. The electronic game table as recited in claim 1, wherein segments of each section cover that hide one or more of the bay opening have a same appearance as a part of the rail that does not include a bay.

6. A system, comprising:
    a rail for connecting to a tabletop of a game table, the rail having sections;
    bay openings in at least one of the sections, each bay opening for exposing user-interface hardware to a user of the game table, at least one of the bay openings hosting a mounted touch-screen display for tracking an associated user of the game table and at least one of the bay openings hosting a player-ID card reader for tracking the associated user of the game table;

a set of interchangeable section covers, connectable to the rail;

a first section cover of the set to hide all of the bay openings;

a second section cover of the set to expose all of the bay openings;

at least one section cover of the set to hide the mounted touch-screen display and the player-ID card reader; and at least one section cover of the set to expose the mounted touch-screen display and the player-ID card reader.

* * * * *